United States Patent [19]

Beatty et al.

[11] Patent Number: 5,781,798
[45] Date of Patent: Jul. 14, 1998

[54] METHOD AND APPARATUS FOR PROVIDING HOT SWAPPING CAPABILITY IN A COMPUTER SYSTEM WITH STATIC PERIPHERAL DRIVER SOFTWARE

[75] Inventors: Dana Lynn Beatty; Richard E. Hamm, both of Boca Raton, Fla.; Yoshi Nishida, Kew Gardens, N.Y.

[73] Assignee: International Business Machines Corporation, Armonk, N.Y.

[21] Appl. No.: 751,256

[22] Filed: Nov. 18, 1996

Related U.S. Application Data

[63] Continuation of Ser. No. 176,104, Dec. 30, 1993, abandoned.

[51] Int. Cl.$^6$ ............................................. G06F 15/40
[52] U.S. Cl. ..................... 395/830; 395/283; 395/500
[58] Field of Search ................... 395/821–823, 395/828–830, 835–839, 280–284, 500, 651, 653

[56] References Cited

U.S. PATENT DOCUMENTS

| | | | |
|---|---|---|---|
| 4,589,063 | 5/1986 | Shah et al. | 395/828 |
| 4,975,829 | 12/1990 | Clarey et al. | 395/500 |
| 5,077,683 | 12/1991 | Aydin | 361/686 |
| 5,210,855 | 5/1993 | Bartol | 395/500 |
| 5,265,252 | 11/1993 | Rawson et al. | 395/681 |
| 5,317,695 | 5/1994 | Celi, jr. | 395/836 |
| 5,319,751 | 6/1994 | Garney | 395/442 |
| 5,379,437 | 1/1995 | Celi et al. | 395/651 |
| 5,386,567 | 1/1995 | Lien et al. | 395/653 |
| 5,404,494 | 4/1995 | Garney | 395/500 |
| 5,404,524 | 4/1995 | Celi | 395/652 |
| 5,412,798 | 5/1995 | Garny | 395/651 |
| 5,450,570 | 9/1995 | Richek et al. | 395/500 |
| 5,465,364 | 11/1995 | Lathrop et al. | 395/681 |
| 5,537,597 | 7/1996 | Sandage | 395/712 |
| 5,548,782 | 8/1996 | Michael et al. | 395/835 |

OTHER PUBLICATIONS

"Let's Get Small", by Nilsson, B.A., Computer Shopper, v13, n6, p. 581(5), Jun. 1993.

"The Debate is Over", by Davis, Dwight, Electronic Business Buyer, v19, n10, p. 49(3), Oct. 1993.

"Proxim Adapts its Range LAN Plug-In Card for the PCMCIA", Computergram International, Jul. 26, 1993.

"Memory-Card Topics Abound at PC Design Conference", by Nass, Richard, Electronic Design, v40, n15, p. 34(4), Jul. 23, 1992.

Primary Examiner—Moustafa M. Meky
Attorney, Agent, or Firm—Jeffrey S. LaBaw; David H. Judson

[57] ABSTRACT

A computer system which utilizes a "static" peripheral device driver that recognizes configuration changes only on system initialization is modified to provide hot insertion capability. In particular, in order to provide hot insertion capability, software which allows operation with PCMCIA compatible peripherals is loaded into the computer and the static peripheral device driver is modified to communicate directly with the PCMCIA software. In this manner the conventional PCMCIA software recognizes hot insertions and removals and these vents are communicated to the static driver by means of internal data packets.

25 Claims, 4 Drawing Sheets

METHOD AND APPARATUS FOR PROVIDING HOT SWAPPING CAPABILITY IN A COMPUTER SYSTEM WITH STATIC PERIPHERAL DRIVER SOFTWARE

This is a continuation of application Ser. No. 08/176,104 filed on Dec. 30, 1993, now abandoned.

FIELD OF THE INVENTION

This invention relates generally to computer systems which utilize peripheral devices such as printers, modems, scanners, etc. More specifically, it relates to computer systems which utilize peripheral devices which may be added to or removed from the system after the system is initialized.

BACKGROUND OF THE INVENTION

A computer cannot transmit data across telephone lines or over a local area network (LAN), nor can it produce a hard copy of an image it has produced or store data permanently—without the aid of peripheral devices (peripherals). Peripherals such as modems, LAN adapters, printers, and storage devices, enable a computer to communicate and store data involved in its operations. In this sense, peripherals are anything but peripheral to the operation of computers.

Peripheral devices ar e normally connected to a computer by means of an interface circuit located on a printed circuit board or adapter card. Adapter cards can be removed and inserted into connectors or expansion "slots" which are, in turn, connected to the internal circuitry of the computer. The connectors allow an interface card and the associ ated peripheral to be easily physically added or removed from the computer system.

In many computer systems, the peripheral interface cards must be inserted or removed from the expansion slots in order to configure the computer before the computer is powered up or initialized. During initialization, each of the slots is usually assigned a communication channel or port which can be used by application programs running on the computer to access the peripheral in the associated slot. Specialized software programs or "peripheral device drivers" are also loaded into the system and each driver is assigned one or more ports. During system initialization, the drivers are associated with specific peripheral devices located on each port by having each driver poll or interrogate each of its assigned slots to identify the peripheral devices in each slot. A peripheral device driver is specific to particular type of peripheral and will only generate the proper commands and data to control and coordinate that type of peripheral device. Consequently, the peripheral device driver will only recognize peripheral devices installed in its assigned slots if the peripheral devices are of the correct type. This operation is simple but may have significant drawbacks.

For example, a computer user may want to create or manipulate an image with a graphics program, send the image to an attached printer peripheral device to obtain a hard copy of the image and also transmit a copy of the image to a remote location by means of a fax/modem peripheral device. Ordinarily, a computer has a limited number of available channels, or ports, through which the computer communicates with peripherals. If all the computer's communications channels, or ports, are occupied and a new service is needed, then the computer must be powered down in order to physically change the peripherals to provide the desired service.

Assume, in the previous example, that a printer peripheral device is connected to the computer system in question, but that a modem cannot be connected because there are no available ports. Then the user can easily obtain a hard copy of the created image, but in order to send the image to a remote location, the user must save the image, exit the graphics program, turn off the computer, remove a peripheral device from one of the ports, insert the fax/modem peripheral device into that port, reinitialize the computer, call up the image (maybe even re-enter the graphics program), and proceed to transmit the image using the fax/modem peripheral. This operation is exceedingly inconvenient.

Consequently, the already significant utility of peripheral devices would be even greater if one were able to insert or remove them from the expansion slots while the associated computer continues to operate. Aside from obvious power surge problems, one impediment to inserting or removing peripheral devices from some computer systems while they continue to operate, (called "hot swapping" capability) arises from the fact that existing peripheral device drivers are designed to "poll", or interrogate one by one, their assigned peripheral ports only when the computer is initialized during power up or re-initialization. This type of peripheral device driver is called a "static" driver in the sense that, after the initial polling, the driver operates as though the system configuration always remains the same.

Therefore, if a peripheral device is removed or inserted after initialization, such a static peripheral device driver will be oblivious to this alteration until re-initialization and, until then, will either attempt to operate with a device that is no longer a part of the system or ignore a device which has been added to the system.

In order to overcome these difficulties, more recent computer systems and peripheral devices have been designed to accommodate hot swapping of the peripheral devices and, in particular, some standards which include hot swapping capability have been developed. For example, computers and peripheral devices which adhere to the Personal Computer Memory Card International Association (PCMCIA) standard permit the hot insertion and hot removal of peripherals and this standard is presently in common use with notebook and laptop computers. Consequently, many peripheral devices which adhere to the PCMCIA standard are already in existence.

PCMCIA computer systems which accommodate hot insertion and hot removal typically do not use static peripheral device drivers, but instead continuously poll the peripheral ports to detect a peripheral insertion or removal during system operation. Therefore, such systems can easily provide hot insertion and hot removal capabilities. However, it would be advantageous to be able to use PCMCIA peripheral devices with existing computer systems which employ static peripheral device is drivers while still providing hot insertion and hot removal (hot swapping) capabilities.

One way to use PCMCIA devices with existing "static" systems is to rewrite the static peripheral device drivers to convert them to PCMCIA client device drivers, which provide device-specific support for each PCMCIA device. However, this conversion would require major modifications to the existing static device drivers; an introduction of a new PCMCIA device would also require additional major modifications to the modified static device drivers in order to incorporate the required device-specific support into the ever-growing driver software. Such a conversion would force each user to use a peripheral device driver which incorporated device-specific support for PCMCIA peripheral devices, even if the user did not have any PCMCIA devices and had no intention of using such devices. Therefore, storage space would be required for software which could not be used. Further, existing applications programs which have been written for static peripheral device drivers may no longer be compatible with the rewritten drivers.

It is therefore an object of the invention to enable existing computer systems which employ static peripheral device drivers to operate with peripheral devices which are inserted into or removed from the system subsequent to the computer's initialization.

It is a further object of the invention to enable existing computer systems which employ static peripheral device drivers to utilize PCMCIA peripheral devices without requiring that static peripheral device driver incorporate device-specific support for each additional PCMCIA peripheral device.

It is a further object of the invention to maintain compatibility with existing applications programs written for computer systems which employ static serial device drivers.

SUMMARY OF THE INVENTION

The foregoing problems are solved and the foregoing objects are achieved in one illustrative embodiment of the invention in which PCMCIA compatibility is provided in a computer system with static device driver software by loading PCMCIA-specific software onto the computer system and modifying the existing static peripheral device drivers so that they communicate with the PCMCIA software.

In particular, the PCMCIA software includes special client device driver software that sends a pre-defined communications packet to the modified static peripheral device driver when the PCMCIA client device driver determines that an associated PCMCIA device has been either inserted into or removed from the computer system. The communications packet contains information which identifies the peripheral device which has been inserted or removed and, upon recognizing the packets, the static peripheral device driver recognizes the availability or non-availability of the associated communication port.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
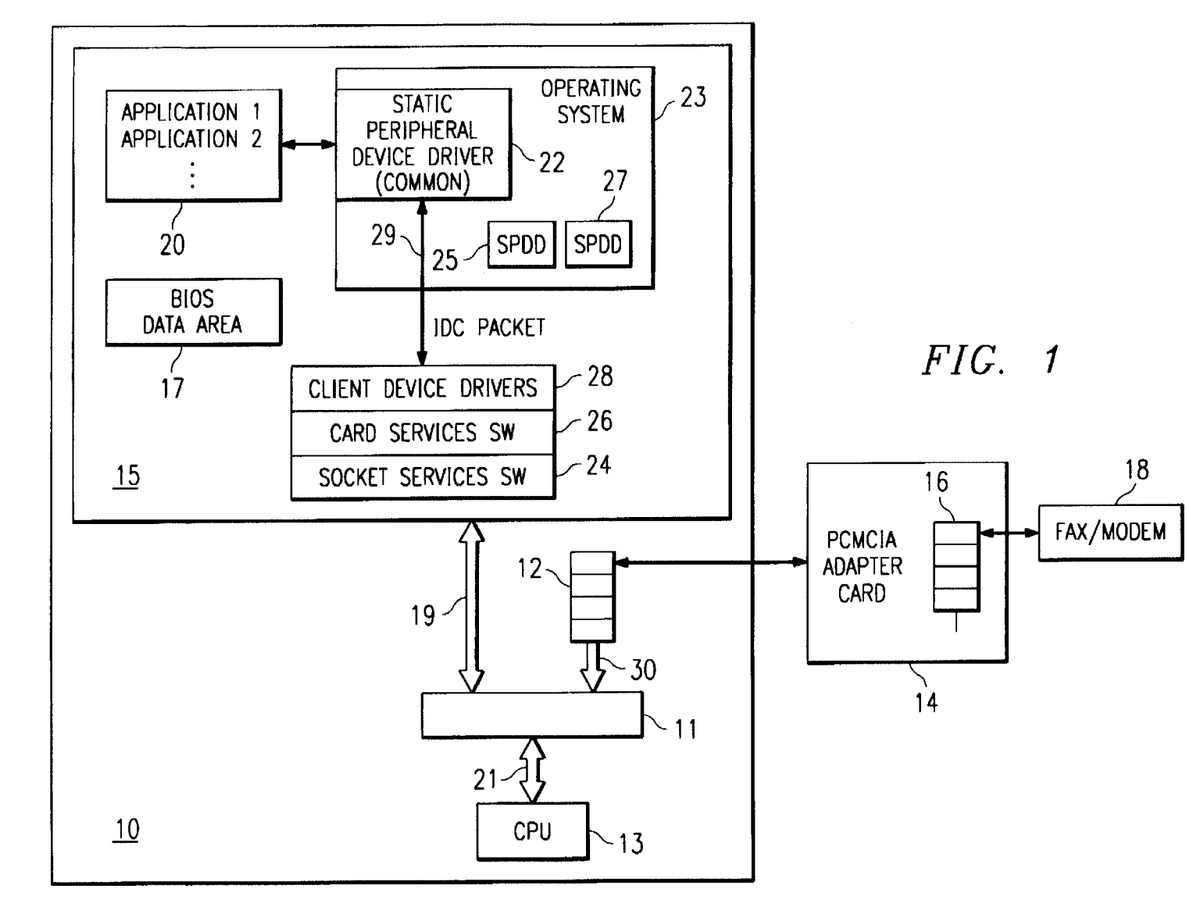
FIG. 1 is an exemplary block diagram of a computer system incorporating the invention.

FIG. 1 illustrates, in simplified schematic form, the basic components of a computer system 10 which are relevant to the present invention. The computer system 10 includes a central processing unit (CPU) 13 which is connected to a system bus 11 as indicated by arrow 21 and, via the system bus, to various other components such as to system memory area 15 (as indicated by arrow 19) and (as indicated by arrow 30) to peripheral adapter card slots 12 into which various peripheral adapter cards (not shown) may be inserted. These peripheral adapter cards may include memory cards, communications adapters, video cards, etc and may interact over system bus 11 to exchange data and commands. The configuration and arrangement of the peripheral adapter card slots are dependent on the exact characteristics of the system bus 11 which might illustratively be a MICROCHANNEL®, ISA or EISA bus.

CPU 13 also has access to the bus 11 and interacts, through the bus, with devices inserted in the card slots 12 and with system memory 15. Stored within the system memory 15 are various software components including various application programs 20, of which Application Program 1 and Application Program 2 are shown, an operating system 23 and BIOS data area 17. As will be described in detail below, when PCMCIA peripheral devices are present in the computer system, additional software components including client device drivers 28, card services software 26 and socket services software are also present.

Operating system 23 may illustratively be a conventional operating system such as OS/2® which is developed and distributed by International Business Machines Corporation, Armonk, New York. Assuming for initial discussion that PCMCIA support is not present in the computer 10, operating system 23 includes a static peripheral device driver (SPDD) comprising a device common portion 22 and device specific portions 25 and 27. The common portion 22 of static peripheral device driver identifies, at the time of system initialization, the peripheral devices which occupy each of card slots 12. More particularly, in one illustrative commercial embodiment of the system bus called a MICROCHANNEL® bus which is developed and distributed by International Business Machines Corporation, Armonk, New York, at the time of system initialization, a resource allocation program polls or examines each bus address to determine which of card slots 12 actually contain cards. The presence or absence of a card in a given slot is noted and stored in the BIOS data area 17. Subsequently, during initialization, the static peripheral device driver 22 examines the BIOS data area 17 to determine which ports are active. The static peripheral device driver portion 22 is a conventional "stub" driver which, as is well-known in the art, provides support to various device-specific drivers 25 and 27 by allocating memory and data structures for each of the various peripheral devices (not shown) attached to the computer 10. In addition, when the computer 10 is initialized, the static peripheral driver common portion 22 identifies directly, or indirectly, the peripheral devices are attached to the computer 10 in the active slots. The applications programs 20 then interact with the peripheral device driver portions 22, 25 and 27 to send data and commands to the peripheral devices and to receive data and commands from those devices.

When such a conventional computer system is provided with PCMCIA capabilities, additional software and hardware is added and the common portion 22 of the static device driver is modified as discussed below. In particular, the system hardware may be augmented by plugging a PCMCIA adapter card 14 into one of peripheral card slots 12. Alternatively, many computer systems have a serial connector attached to system bus 11 which can accommodate the PCMCIA adapter without using one of card slots 12. The PCMCIA adapter 14 comprises interface circuitry which converts the PCMCIA electrical, mechanical, and timing specifications used in PCMCIA devices and outlined in the well-known PCMCIA standard to the corresponding electrical, mechanical, and timing specifications used on the system bus 11.

Adapter card 14 has associated with it PCMCIA slots 16 which it controls. The PCMCIA slots may, for example, be physically located on the adapter card 14 and each of slots 16 accepts a PCMCIA device adapter card such as a fax/modem card 18. These latter adapter cards are well-known devices which comprise a credit-card-sized computer card, or "smart card" that contains the aforementioned interface circuitry and may also contain an on-board non-volatile configuration memory which can be interrogated to retrieve configuration information concerning the interface circuitry.

Additional software is also loaded into the system memory area 15 in order to provide PCMCIA support. This additional software includes client device drivers 28, socket services software 24 and card services software 26. The client device drivers 28, socket services software 24 and card services software 26 comprise programs that are used in conventional PCMCIA machines and, as such, are well-known. Accordingly, they will not be discussed in detail herein. In accordance with normal PCMCIA operation, each PCMCIA peripheral utilizes the three illustrated layers of support, i.e. socket services 24, card services 26, and one of the client device drivers 28 in order to interact with the operating system 23.

More particularly, each client device driver of client device drivers 28 is a device-specific software program which is specific to a particular type of PCMCIA device, such as a fax/modem (not shown) attached to the fax/modem card 18. When it is initially installed, each of client device drivers 28 "registers" with card services software 26 by indicating that it should be informed of any relevant card insertions or removals.

Socket services software 24 monitors the PCMCIA card slots 16 to detect the insertion or removal of a peripheral device into one of the slots. This monitoring may be performed by examining registers which are associated with each card slot 16 and are physically located on the adapter 14 to determine whether a card has been inserted or removed from a slot. Socket services software 24 stores this information in a predetermined location, then calls the card services routine 26.

Card services 26 "takes a snapshot" of a configuration table located in the peripheral driver portion 22 just after system initialization and monitors any changes in card slots. More specifically, card services proceeds through its internal list of registered client drivers 28. Each driver is called sequentially by card services software 26 which passes a control block of information that, in turn, includes the slot number and a flag which indicates the type of event (insertion or removal).

In the case of an insertion, each client device driver of drivers 28 uses the slot number to interrogate the non-volatile configuration memory in the peripheral adapter card in the identified slot (for example, card 18) to determine whether the newly-inserted peripheral device is a device which can be supported by the particular client device driver 28. If the peripheral device is of the correct type, the client device driver aids in the initialization and configuration of the associated adapter card.

Alternatively, if a card is removed, the client driver 28 determines which card is removed by reading the slot number which was provided by is card services 26 and assists in deallocating resources associated with the affected slot.

The mere addition of the PCMCIA software routines, 24, 26 and 28 to the system memory area 15 would not allow their operation with the existing static peripheral device driver software 22, 25 and 27 which interaction is necessary because the driver software allocates memory and other resources for each slot. However, in accordance with one aspect of the invention, both the client device drivers 28 and the common portion 22 of the static peripheral device driver software are modified in order to directly communicate. This communication allows the peripheral device change information received and processed by the PCMCIA software to be directly communicated to the static peripheral device driver. Thus, the required configuration changes can be made in the static peripheral device driver without requiring the inclusion of the PCMCIA device-specific software in the static peripheral device driver. Accordingly, only those computer systems which need to support PCMCIA devices need load the PCMCIA software 24,26 and 28. All computer systems must have the modified static peripheral device driver, but, as will be discussed below, the modifications are not extensive so that valuable system memory is not tied up with unused programs in the case where no PCMCIA support is required.

More particularly, after ascertaining the type of peripheral in a given slot, the associated client device driver (one of drivers 28) sends a pre-defined inter-device communications (IDC) data packet to the modified common portion 22 of the static peripheral device driver as indicated by arrow 29. Upon receiving this packet, the modified peripheral driver portion 22 installs the resources and creates associated support structures (such as memory and data structures) for the associated peripheral unless the port is already assigned to another peripheral. If the requested communications port is already used by a different peripheral, an error occurs and the peripheral driver 22 returns an IPC packet containing an error code to the requesting client device driver of drivers 28. The error code may be used, for example, to inform the computer user that there is a communications port conflict and to instruct the user to reassign the communications ports.

Figure 2A:
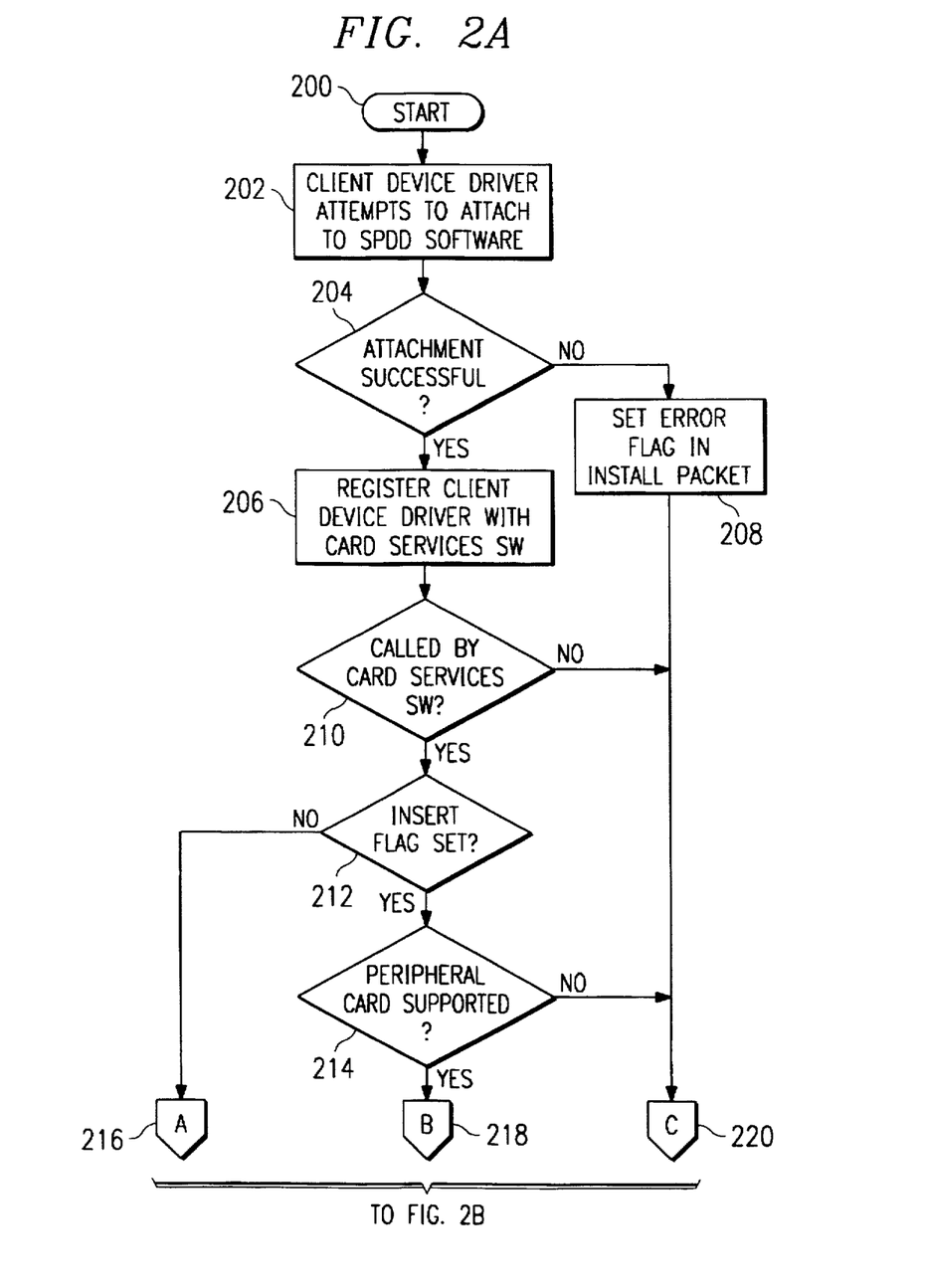
FIGS. 2A and 2B, when placed together, comprise a flowchart which illustrates the operation of the client device driver software of the invention in the context of the insertion and removal of peripheral devices.
Figure 2B:
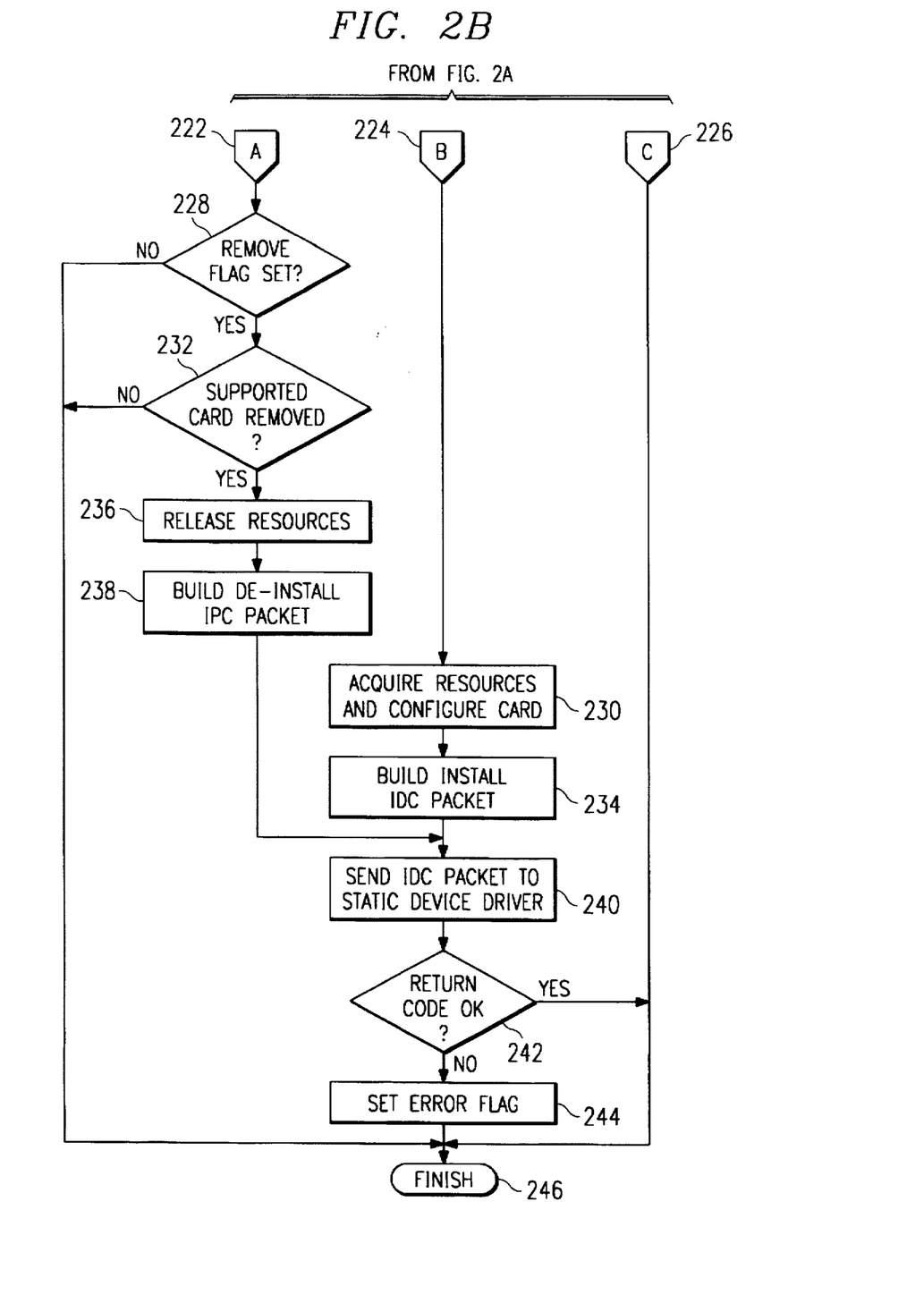

FIGS. 2A and 2B together form a flowchart of an illustrative routine executed by the client device drivers in order to provide hot swapping capabilities. The routine starts at step 200 and proceeds to step 202 where one of client device drivers 28 attempts to attach to the common portion 22 of the static peripheral device driver. This step is necessary because the client device drivers 28 may be loaded into a computer system which does not use a static operating system such as OS/2®. In this latter case, the common portion 22 of the static device driver will not be present. Accordingly, in step 204, a check is made to determine whether the attachment is successful. If the attachment is not successful, the routine proceeds to set an error flag in the client device driver installation packet (step 208) and, in turn, proceeds via off-page connectors 220 and 226 to finish in step 246. Alternatively, if, in step 204, the attempt to attach to the static peripheral device driver software is successful, the routine obtains an address to which it will later send the IDC packet in order to communicate with the static peripheral device driver software. The routine then proceeds to step 206.

In step 206, the client device driver registers with the card services software 26 in a manner previously described. Essentially, by registering, the client device driver informs the card services software 26 that the client device driver should be notified of any card insertions or removals.

At this point, the client device driver waits for a call from the card services software indicating an insertion or a removal event. For example, at step 210, a check is made to determine whether an insertion or a removal event has been detected by card services 26. If no event has been detected, the routine exits via off-page connectors 220 and 226 and step 246.

Alternatively, if in step 210, an appropriate event has been detected, card services 26 calls the client device driver (passing a control block of information as previously mentioned).

In step 212, the passed control block is examined by the client device driver to determine whether an insert flag has been set thereby identifying the event as an insertion event. If the insertion flag has not been set, the routine proceeds via off-page connectors 216 and 22 to check for a removal as will hereinafter be explained in detail.

Alternatively, assuming, for this example, that a device such as fax/modem card 18 has been inserted into one of the card slots 16, socket services 24 alerts card services 26 to the card insertion. Card services 26 then sets the insertion flag in the control block and the routine proceeds to step 214.

In step 214, a check is made to insure that the card which is inserted is a card of the type which can be supported by the client device driver. As previously mentioned, this check is made by interrogating the non-volatile configuration memory located on board the card. If the card is not of the proper type, then the routine proceeds to exit via offpage connectors 220 and 226 and step 246. However, if the card is of the proper type, the routine proceeds via off-page connectors 218 and 224 to step 230.

In step 230 the client device driver acquires resources necessary to configure the inserted card, such as an interrupt request (IRQ) number, and a base address from card services 26. The client driver also configures the inserted card for operation at this point.

Figure 3:
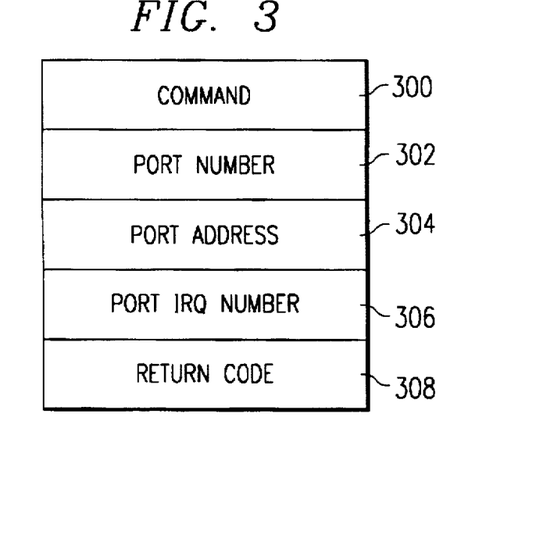
FIG. 3 is a block schematic diagram of the information contained in the pre-defined communication packet which is sent from the PCMCIA software to the modified static peripheral device driver.

Then, at step 234, the client driver builds an install IDC packet, including the above listed resources, which it will send to the serial driver 22. The form of the IDC packet is shown in more detail in FIG. 3. In particular, FIG. 3 illustrates the structure of an exemplary IDC packet of the type exchanged between a client device driver 28 and the static peripheral device driver 22 and comprises data and command words 300–308. The command word 300 is either an install or de-install command, which the static peripheral communications driver 22 interprets to allocate or de-allocate resources such as memory and data structures for use by the attached peripheral devices.

The communication port number data word 302, port or base address data word 304, and port IRQ number data word 306 contain the values assigned to a peripheral device by card services 26. This information is passed to the peripheral device driver 22 and permits the driver 22 to support a new peripheral device. The return code 408 is used by the driver 22 to provide an error indication to the client driver 28 as will be discussed below. Such an error code may be returned to a client device driver if, for example, a communication port, an IRQ number, or a communications port address is already being used by another device. There are also error codes which indicate that a communication port is not installed and therefore cannot be de-installed or that an invalid request has been made.

Then the routine proceeds to step 240, where the completed install IPC packet is sent to the static peripheral device driver 22. The driver 22 examines the packet, as further described in detail in connection with the discussion of FIG. 4, and generates a return code. The return code is sent back to the client device driver for inspection by means of a returning IPC packet.

Following step 240, in step 242, the client device driver analyzes the return code in the IPC packet received from the serial driver 22. If the return code indicates that an error has occurred, the client driver proceeds to step 244, where an error flag is set. The error flag may be used by the client driver to, for example, send a message to the computer operator that the insertion or removal has failed and that the operator should attempt to insert the card again or to free resources that were not released because of a faulty removal. The routine then ends in step 246.

In the case of a card removal a slightly different path is followed. In particular, in step 212, is the client device driver is called by the card services software 26, but the insert flag is not set, the routine proceeds via off-page connectors 216 and 22 to step 228 where a remove flag is checked. If the remove flag has not been set, then the detected event was neither an insertion nor a removal and the routine exits via step 246.

Alternatively, if the remove flag has been set, in step 232, the routine performs a check to determine whether the card which was removed was a card that was supported by the client driver. If the card is, not supported by the driver, the routine exits via step 246.

If, in step 232, the check indicates that the removed card was supported by the client device driver, the driver releases previously allocated resources (such as the IRQ number, and base address) to the card services software 26. The routine then proceeds to step 238 where a de-install IPC packet is built in a similar manner to that discussed above in relation to step 234 using the format shown in FIG. 3.

The client device driver then proceeds to send the IPC packet to the static peripheral device driver, examine the return code in the returning IPC packet and, if necessary, set the error flag as indicated in steps 240–246.

Figure 4:
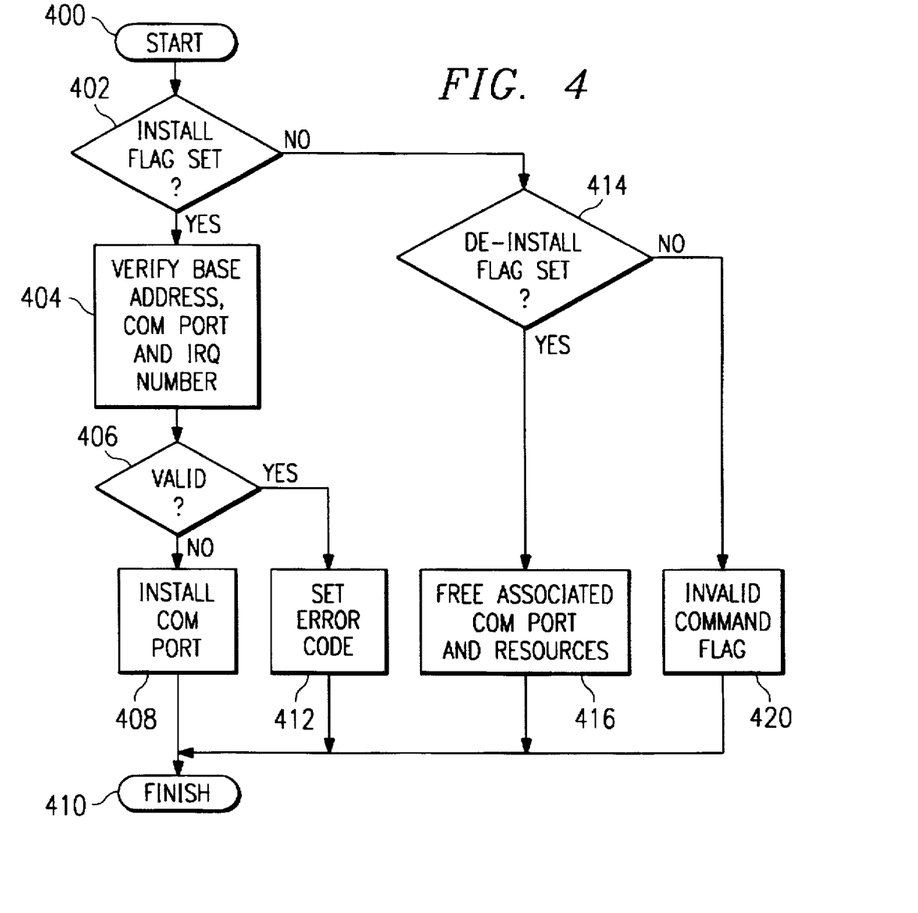
FIG. 4 is a flow chart which illustrates the operation of the modified static device driver in the context of the insertion and deletion of peripheral devices.

FIG. 4 is an illustrative flowchart which depicts the operation of the static peripheral device driver 22 in response to an incoming IPC packet sent from one of the client device drivers 28. The routine begins at step 400 and proceeds to step 402, where the peripheral device driver 22 checks an install flag to determine whether the client device driver 28 is requesting that the peripheral driver 22 install a peripheral. If the command is an installation request, the routine proceeds to step 404 where the base address and IRQ number are checked and verified. This verification is necessary because the client driver 28 may request a specific IRQ number and base address from card services 26 which IRQ number and base address correspond to a predetermined communications port base address and IRQ number that one of applications programs 20 expects to be associated with a particular peripheral such as fax/modem card 18. In this manner, existing applications programs which, for example, assume that specific port assignments are in effect, may be used with the new PCMCIA devices without modification to the applications programs.

The routine then proceeds to step 406, where a decision is made whether the base communications address and IRQ number are valid. If these values are not valid, that is, if they have already been assigned to a different device, the routine proceeds to step 412 where an error code is set. This error code is returned to the client driver 28 as explained in connection with FIG. 2 and controls the further operations of the system.

If, on the other hand, in step 406, the communications port base address and IRQ number are valid, the routine installs the communications port at step 408. This installation is accomplished by creating the data structures for and assigning required resources to the peripheral adapter card to be installed. After either step 408 or 412, the routine proceeds to step 410, the end.

If, at step 402, the routine determines from the incoming IPC packet command word that the desired action is not an installation, it proceeds to step 414 where a check is made to determine whether the command is a de-install command. If it is, the routine proceeds to step 416, where the communications port base address, IRQ number, memory, and data structures associated with the removed device are released. The routine then exits via step 410.

However, if, at step 414, the routine determines that the IPC as packet command is not a de-install command, the routine proceeds to step 420 where an error code flag is set indicating that an invalid command was received. This flag, or error code, will be read by the client device driver 28 from the returning IPC packet as described in FIG. 2. Following step 420, the serial driver 22 exits at step 410.

The foregoing description has been limited to a specific embodiment of this invention. It will be apparent, however, that variations and modifications may be made to the invention, with the attainment of some or all of its advantages. Illustratively, the inventive concepts may be used in situations other than that described above. For example, the invention may be used in connection with a computer system which already incorporates PCMCIA support. In such a system, the inventive principles can be used to allow an operating system such as OS/2® which has a static peripheral device driver to be loaded and used on the system. In particular, the client device drivers will already have the required modifications which allow them to communicate with the static peripheral device driver. Thus when the driver is actually installed, the attachment sequence (outlined in steps 202 and 204 of FIG. 2A) will cause each client device driver to recognize the newlyadded static peripheral device driver.

Therefore, it is the object of the appended claims to cover all such variations and modifications as come within the true spirit and scope of the invention.

What is claimed is:

1. Apparatus for providing hot swapping capability in a computer system having an adapter card coupled, thereto the adapter card having a plurality of adapter slots and a peripheral device coupled to one of the adapter slots, the apparatus comprising:

a static peripheral device driver, stored in a memory of the computer, the static peripheral device driver for managing system resources associated with the peripheral device, the static peripheral device driver having a common portion and a device specific portion, wherein the common portion of the static peripheral device driver is normally operative to identify the peripheral device coupled to the computer system only during system initialization;

means for monitoring each of the plurality of adapter slots and for detecting when the peripheral device has been connected to the adapter slot and for detecting when the peripheral device has been disconnected from the adapter slot;

means cooperating with the monitoring means for generating a first inter-device communications data packet when the peripheral device has been connected to the adapter slot and for generating a second inter-device communications data packet when the peripheral device has been disconnected from the adapter slot; and means for sending the first and second inter-device communications data packets to the common portion of said static peripheral device driver wherein:

in response to the first inter-device communications data packets the common portion of the static peripheral device driver installs system resources after system initialization has taken place; and in response to the second inter-device communications data packet, the common portion of the static peripheral device driver releases system resources after system initialization has taken place.

2. Apparatus according to claim 1 wherein the means for generating comprises:

means for generating an identification code identifying the peripheral adapter slot; and means for building the inter-device communications data packet, wherein the inter-device communications data packet includes:

a peripheral adapter slot identification code; and a command code having a first value in response to a peripheral device being connected to the peripheral adapter slot and having a second value in response to the peripheral device being disconnected from the peripheral adapter slot.

3. Apparatus according to claim 2 wherein the common portion of the static peripheral device driver comprises:

means responsive to the command code for allocating system resources for the peripheral device when the peripheral device is connected to the computer system; and means responsive to the command code of the inter-device communications data packet for releasing system resources for the peripheral device when the peripheral device is disconnected from the computer system.

4. Apparatus according to claim 1 further comprising:

means responsive to the installation and release of system resources for building a return inter-device communications data packet having data indicating whether the allocation and release of the system resources was successful; and means for sending the return inter-device communications data packet from the static peripheral device driver to the means for monitoring.

5. Apparatus according to claim 1 wherein the peripheral device includes a configuration memory and wherein the means for monitoring comprises:

means for generating an identification code identifying the peripheral adapter slot;

means responsive to the identification code for interrogating the configuration memory and retrieving configuration information; and means responsive to the retrieved configuration information for selecting a device-specific driver for the peripheral device.

6. Apparatus according to claim 1 wherein the common portion of the static peripheral device driver includes means for allocating and releasing system meory and data structures.

7. A computer system having hot swapping capability for a plurality of peripheral devices which can be connected to, or disconnected from, the computer system through a plurality of peripheral adapter slots, the computer system comprising:

static peripheral device driver software which manages system resources associated with each of the plurality of peripheral devices and is normally operative to identify a peripheral device coupled to the computer system only during system initialization;

means for determining when one of the plurality of peripheral devices has been connected to, and disconnected from, the computer system by examining registers which are associated with each peripheral adapter slot and which are physically located on a peripheral adapter;

means cooperating with the determining means for generating an identifying code identifying one of the peripheral adapter slots through which the one peripheral device has been connected to, and disconnected from, the computer system;

means cooperating with the determining means and the generating means for generating an inter-device communications data packet when the peripheral device has been connected to, and disconnected from, the computer system, the inter-device communications data packet having information indicating the identifying code and a command code indicating whether the peripheral device has been connected to, or disconnected from, the computer system;

means for sending the inter-device communications data packet to the static peripheral device driver; and means responsive to the inter-device communications data packet for controlling the static peripheral device driver to allocate and release the system resources corresponding to the one peripheral device has been connected to, and disconnected from the computer system after system initialization has taken place.

8. A computer system according to claim 7 wherein the controlling means comprises:

means responsive to the command code for allocating system resources for the one peripheral device when the one peripheral device is connected to the computer system; and means responsive to the command code for releasing system resources for the one peripheral device when the one peripheral device is disconnected from the computer system.

9. A computer system according to claim 8 further comprising:

means responsive to the allocation and release of system resources for building a return inter-device communications data packet having data indicating whether the allocation and release of the system resources was successful; and means for sending the return inter-device communications data packet from the static peripheral device driver to the determining means.

10. A computer system comprising:

a computer having a plurality of card slots;

a plurality of peripheral devices, at least one of the plurality of peripheral devices conforming to a first standard which permits hot swapping of peripheral devices;

an adapter card having coupled thereto one of the plurality of peripheral devices conforming to the first standard which permits hot swapping of peripheral devices, the adapter card conforming to electrical, mechanical and timing specifications for one of the plurality of card slots and disposed in the one slot, the adapter card providing an interface between the computer and the one of the plurality of peripheral devices that conforms to the first standard which permits hot swapping of peripheral devices;

a static peripheral device driver operating in cooperation with the computer to support each of the plurality of peripheral devices coupled to the computer, the static peripheral device driver including a common portion and a device specific portion, the common portion for polling, only at the time of system initialization, each of the plurality of card slots to determine which of the plurality of card slots have a peripheral device coupled thereto;

a client driver which provides device-specific support to a predetermined type of peripheral device which also conforms to the first standard which permits hot swapping of peripheral devices, the client driver comprising a mechanism for generating control information packet for communicating card insertion and card removal information to the static peripheral device driver; and wherein the static peripheral device driver further comprises means for receiving and interpreting the control information packet from the client driver and releasing or allocating system resources based on the control information packet after system initialization has taken place.

11. A computer system according to claim 10 wherein the client driver further comprises:

means for receiving and interpreting card insertion and card removal information; and means for relaying the card insertion and card removal information to the static peripheral device driver.

12. A computer system according to claim 10 wherein the computer system employs an OS/2 operating system.

13. A computer system according to claim 10 wherein the first standard corresponds to a PCMCIA standard.

14. A method for providing hot swapping capability for a peripheral device in a computer system having static peripheral device driver software which manages system resources associated with the peripheral device and is normally operative to identify a peripheral device coupled to the computer system only during system initialization, the method comprising the steps of:

A. determining when the peripheral device has been connected to, and disconnected from, the computer system;

B. generating an inter-device communications data packet when the peripheral device has been connected to, and disconnected from, the computer system;

C. sending the inter-device communications data packet to the static peripheral device driver; and D. using the inter-device communications data packet to control the static peripheral device driver to allocate and release the system resources associated with the peripheral device after system initialization has taken place.

15. A method according to claim 14 wherein the peripheral device is connected to the computer system through a peripheral adapter slot and wherein step A comprises the step of:

A1. monitoring the peripheral adapter slot.

16. A method according to claim 15 wherein step B comprises the steps of:

B1. generating an identification code identifying the peripheral adapter slot; and B2. building an inter-device communications data packet which includes the peripheral adapter slot identification code and a command code indicating whether the peripheral device is connected to, or disconnected from, the computer system.

17. A method according to claim 16 wherein step D comprises the steps of:
D1. using the command code to allocate system resources for the peripheral device when the peripheral device is connected to the computer system; and
D2. using the command code to release system resources for the peripheral device when the peripheral device is disconnected from the computer system.

18. A method according to claim 14 further comprising the steps of:
E. building a return inter-device communications data packet having data indicating whether the allocation and release of the system resources was successful; and
F. sending the return inter-device communications data packet from the static peripheral device driver to the determining apparatus.

19. A method according to claim 14 wherein the peripheral device is connected to the computer system through a peripheral adapter slot and comprises a configuration memory and wherein step A comprises the steps of:
A2. generating an identification code identifying the peripheral adapter slot;
A3. interrogating the configuration memory and retrieving configuration information; and
A4. selecting a device-specific driver for the peripheral device.

20. A method according to claim 14 wherein step D comprises the step of:
D3. controlling the peripheral device driver to allocate and release system memory and data structures.

21. A method for permitting a computer system to continue operation when peripheral devices are hot swapped from the system, the computer system employing a static peripheral device driver which polls a plurality of peripheral ports only at system initialization to determine the peripheral port configuration and further employing adapters, peripheral devices, and software which conform to the PCMCIA standard, the method comprising the steps of:
A. obtaining card insertion/removal information from PCMCIA software modules;
B. requesting allocation of resources from PCMCIA software modules;
C. sending an inter-device communications packet from a PCMCIA device driver to the static peripheral device driver, the packet containing a command, an IRQ number, a communications port number, and a bus address;
D. forcing the static peripheral device driver to read the packet and respond to the command; and
E. Controlling the static peripheral device driver to allocate system resources and deallocate system resources in response to the command after system initialization has taken place.

22. The method of claim 21 further comprising the steps of:
F. returning a code which indicates whether or not an error occurred in attempting to allocate and de-allocate the system resources.

23. A computer program product for providing hot swapping capability in a computer system having a static peripheral device driver stored in a memory of the computer system, the static peripheral device driver for managing system resources associated with the peripheral device, the static peripheral device driver having a common portion and a device specific portion, wherein the common portion of the static peripheral device driver is normally operative to identify peripheral devices coupled to the computer system only during system initialization, the computer program product comprising:

first computer readable program code means for monitoring each of a plurality of adapter slots and for detecting when a peripheral device has been connected to one of the plurality of adapter slots and for detecting when the peripheral device has been disconnected from one of the plurality of adapter slots;

second computer readable program code means cooperating with the first computer readable program code means, the second computer readable program code means for generating a first inter-device communications data packet when a peripheral device has been connected to the adapter slot and for generating a second inter-device communications data packet when a peripheral device has been disconnected from, the adapter slot;

third computer readable program code means for sending for sending the first and second inter-device communications data packets to the common portion of the static peripheral device driver wherein:

in response to the first inter-device communications data packet, the common portion of the static peripheral device driver installs system resources user system initialization has taken place; and in response to the second inter-device communications data packet, the common portion of the static peripheral device driver releases system resources after system initialization has taken place.

24. A computer program product according to claim 23 further comprising:
a computer readable program code means responsive to the allocation and release of system resources for building a return internal data packet having data indicating whether the allocation and release of the system resources was successful; and
a computer readable program code means for sending the return internal data packet from the static peripheral device driver to the first computer readable program code means.

25. A computer program product according to claim 23 wherein a peripheral device having a configuration memory is connected to the computer system through a peripheral device adapter slot and wherein the first computer readable program code comprises:
a computer readable program code means for generating an identification code identifying the peripheral adapter slot;
fourth computer readable computer code means responsive to the identification code for interrogating the configuration memory and retrieving configuration information; and
fifth computer readable computer code means responsive to the retrieved configuration information for selecting a device-specific driver for the peripheral device.

* * * * *